(12) United States Patent
Liang et al.

(10) Patent No.: US 10,023,765 B2
(45) Date of Patent: Jul. 17, 2018

(54) METHOD OF PREPARING STURGEON SKIN GELATIN AND STURGEON SKIN GELATIN FILM WITH ANTIOXIDANT ACTIVITY

(71) Applicants: Chengyuan Liang, Xi'an (CN); Minyi Jia, Xi'an (CN); Danni Tian, Xi'an (CN); Shunjun Ding, Xi'an (CN); Xuechuan Wang, Xi'an (CN); Han Li, Xi'an (CN); Wei Liu, Xi'an (CN)

(72) Inventors: Chengyuan Liang, Xi'an (CN); Minyi Jia, Xi'an (CN); Danni Tian, Xi'an (CN); Shunjun Ding, Xi'an (CN); Xuechuan Wang, Xi'an (CN); Han Li, Xi'an (CN); Wei Liu, Xi'an (CN)

(73) Assignee: Shaanxi University of Science and Technology, Xi'an (CN)

( * ) Notice: Subject to any disclaimer, the term of this patent is extended or adjusted under 35 U.S.C. 154(b) by 0 days.

(21) Appl. No.: 15/605,985

(22) Filed: May 26, 2017

(65) Prior Publication Data
US 2018/0094167 A1   Apr. 5, 2018

(30) Foreign Application Priority Data

Sep. 30, 2016 (CN) .......................... 2016 1 0867190
Sep. 30, 2016 (CN) .......................... 2016 1 0870778

(51) Int. Cl.
| | |
|---|---|
| *C09H 3/02* | (2006.01) |
| *B05D 3/00* | (2006.01) |
| *B05D 1/18* | (2006.01) |
| *B65D 65/46* | (2006.01) |

(52) U.S. Cl.
CPC ................. *C09H 3/02* (2013.01); *B05D 1/18* (2013.01); *B05D 3/007* (2013.01); *B65D 65/463* (2013.01)

(58) Field of Classification Search
CPC .......... C09H 3/02; B65D 65/463; B05D 1/18; B05D 3/007
USPC .......................................................... 426/576
See application file for complete search history.

(56) References Cited

PUBLICATIONS

Hao, S. et al. Food Chemistry. 115: 124-128 (2015).*
Tu, Z-c. et al. J. Food Sci. Technol. 52: 2166-2174 (2015).*
Andrews, B. A. et al. Biotechnol. Bioeng. 90: 380-390.*
Jongjareonrak, A. et al. Food Hydrocolloids. 20: 492-501 (2006).*
Montero et al. (J. Food Sci. 2000. 65: 434-438) (Year: 2000).*

* cited by examiner

*Primary Examiner* — Hamid R Badr

(57) ABSTRACT

A method of preparing a sturgeon skin gelatin with antioxidant activity includes: 1) soaking sturgeon skin in water, and sonicating the sturgeon skin; 2) cutting the sturgeon skin, soaking the sturgeon skin in a NaOH solution, and soaking the sturgeon skin in an HCl solution; 3) washing the sturgeon skin of step 2) to neutral, placing the sturgeon skin in an extraction solution for extracting sturgeon skin protein; and 4) obtaining the sturgeon skin gelatin. A method of preparing a sturgeon skin gelatin film includes: 1) dissolving sturgeon skin gelatin in water to obtain a sturgeon skin gelatin solution; 2) adding glycerine to the sturgeon skin gelatin solution; and 3) obtaining the sturgeon skin gelatin film.

8 Claims, 6 Drawing Sheets

METHOD OF PREPARING STURGEON SKIN GELATIN AND STURGEON SKIN GELATIN FILM WITH ANTIOXIDANT ACTIVITY

The present invention claims priority to Chinese Patent Application Nos. CN 201610867190.6, filed on Sep. 30, 2016, and CN 201610870778.7, filed on Sep. 30, 2016, both of which are incorporated by reference for all purposes as if fully set forth herein.

FIELD OF THE INVENTION

The present invention relates to the field of food packaging, specifically, a method of preparing sturgeon skin gelatin and sturgeon skin gelatin film with antioxidant activity.

BACKGROUND OF THE INVENTION

Sturgeon first appeared 230 million years ago in the Triassic, and has an important value in academic research of the evolution of fish and invertebrates. Sturgeon also has important commercial value as an edible fish. When sturgeon is consumed, sturgeon skin is often discarded. It is a waste of fish resources and also causes pollution.

With the improvement of the quality of life, people pay more attentions to food safety and environmental protection. Plastic packaging becomes a major environmental concern, and green, biodegradable, and edible packaging materials are gaining popularity.

There is a need to produce edible packaging materials from previous discarded materials, e.g., sturgeon skin.

SUMMARY OF THE INVENTION

In one embodiment, the present invention provides a method of preparing a sturgeon skin gelatin with antioxidant activity. The method includes the following steps: 1) soaking sturgeon skin in water at 2-6° C. for 2-3 hours, a weight ratio of sturgeon skin and water being 1:10-15, and sonicating the sturgeon skin for 2-3 hours; 2) cutting the sturgeon skin of step 1) into pieces, soaking the sturgeon skin in a NaOH solution at 2-6° C. for 3-5 hours, washing the sturgeon skin to neutral, and soaking the sturgeon skin in an HCl solution at 2-6° C. for 3-5 hours; 3) washing the sturgeon skin of step 2) to neutral, placing the sturgeon skin in an extraction solution for extracting sturgeon skin protein, the extraction solution being a two-phase aqueous solution and including PEG4000, $Na_2SO_4$, and KCl, and collecting a top phase layer of the extraction solution; and 4) heating the top phase layer of step 3) with a water bath at 50-70° C. for 5-9 hours, filtering the top phase layer to obtain a first filtrate and a filter cake, placing the filter cake in water to obtain a filter cake solution, heating the filer cake solution with the water bath at 60-80° C. for 3-6 hours, filtering filter cake solution to obtain a second filtrate, combining the first filtrate and second filtrate and centrifuging combined filtrate, collecting a supernatant after centrifugation, and lyophilizing the supernatant to obtain the sturgeon skin gelatin.

In another embodiment, in step 1), the sturgeon skin is sonicated at 20-40 KHz.

In another embodiment, in step 2), a concentration of the NaOH solution is 2.0%, a weight ratio of the sturgeon skin and the NaOH solution is 1:1-15, and a concentration of the HCl solution is 0.1-0.5%

In another embodiment, in step 3), the extraction solution includes 10-12% of PEG4000, 14-16% of $Na_2SO_4$, and 1% of KCl.

In another embodiment, the weight ratio of the sturgeon skin and the NaOH solution is 1:10-15.

In one embodiment, the present invention provides a method of preparing a sturgeon skin gelatin film with antioxidant activity. The method includes the following steps: 1) dissolving sturgeon skin gelatin in water to obtain a sturgeon skin gelatin solution by heating with a water bath at 20-40° C. and stirring, a weight ratio of the sturgeon skin gelatin and water being 1:10-30, and filtering the sturgeon skin gelatin solution; 2) adding glycerine to the sturgeon skin gelatin solution of step 1) and stirring, a weight ratio of the sturgeon skin gelatin and glycerine being 5-15:1, and filtering the sturgeon skin gelatin solution; and 3) sonicating the sturgeon skin gelatin solution of step 2) to remove air bubbles, placing the sturgeon skin gelatin solution on an acrylic glass, and drying the sturgeon skin gelatin solution at room temperature for 2-3 days to obtain the sturgeon skin gelatin film.

In another embodiment, in step 1), the weight ratio of the sturgeon skin gelatin and water being 1:20.

In another embodiment, in step 1), heating with a water bath is at 30° C.

In another embodiment, in step 2), the weight ratio of the sturgeon skin gelatin and glycerine being 10:1.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
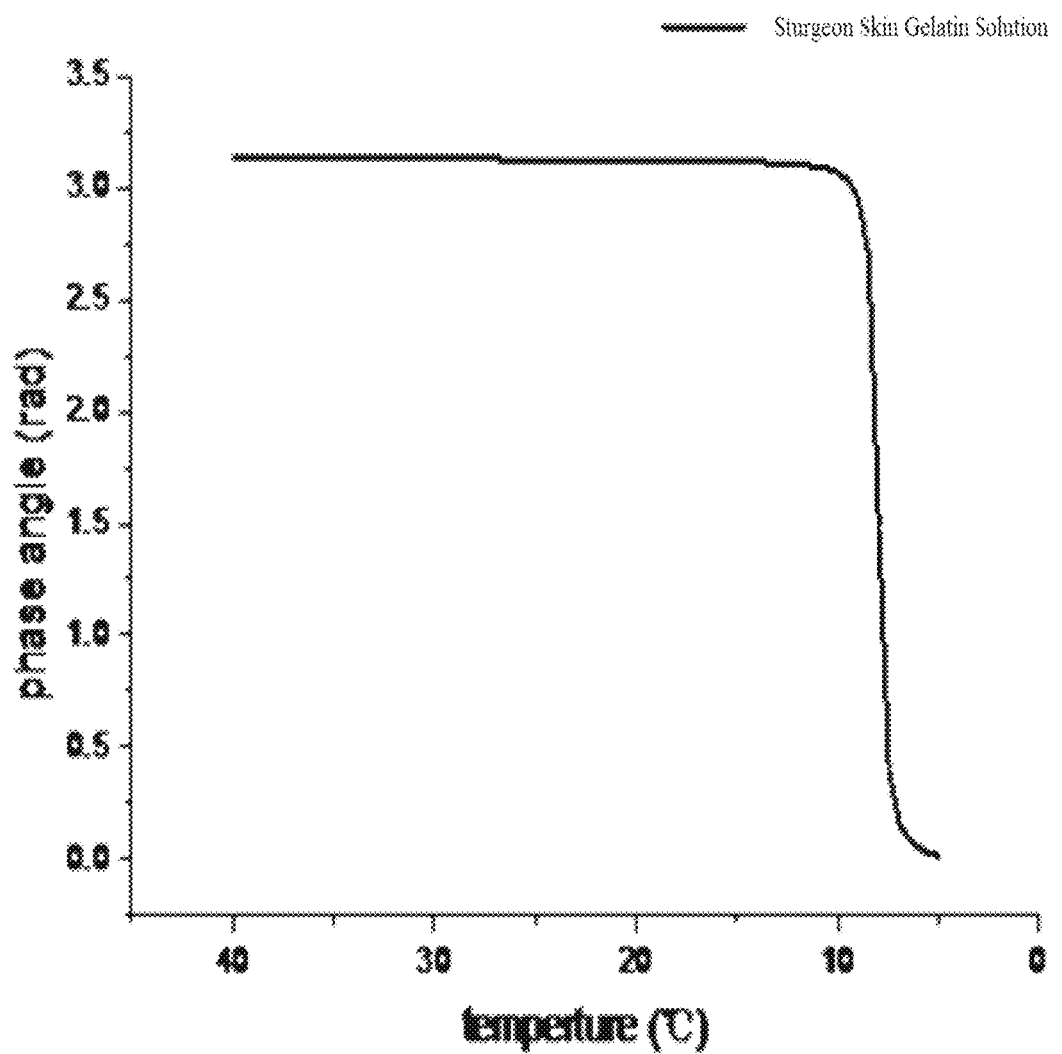
FIG. 1 shows the phase angel of a 6.67% sturgeon skin gelatin solution in a cooling process.

Reference will now be made in detail to embodiments of the present invention, example of which is illustrated in the accompanying drawings.

The following examples further illustrate the present invention, but the present invention is not limited to the following examples.

The present invention provides a method of preparing a sturgeon skin gelatin. It is the first reported method of preparing a sturgeon skin gelatin using sturgeon skin. The method combines sonication and two-phase aqueous solution extraction, reduces extraction time and pollution, increases the gelatin yield, and minimizes the presence of impurity (e.g., fat).

EXAMPLE 1: Preparing a Sturgeon Skin Gelatin 1) measuring 50 grams of sturgeon skin, drying the sturgeon skin naturally, placing the sturgeon skin in water a weight ratio of sturgeon skin and water of 1:10-15, soaking sturgeon skin in distilled water for 24 hours, at 4° C. sonicating the sturgeon skin for 2 hours, and letting the sturgeon skin swell up;

2) covering the sturgeon skin from step 1) with gauze, cutting the sturgeon skin into pieces, soaking the sturgeon skin in a 150 mL 2.0% (w/v) NaOH solution at 4° C. for 24 hours to remove soluble protein and pigment, washing the sturgeon skin with water to neutral, and soaking the sturgeon skin in 150 mL 0.3% (w/v) HCl solution at 4° C. for 4 hours to continue to let the sturgeon skin swell up and to remove minerals, the color of the treated sturgeon skin becoming white, swelling up and having a high elasticity;

3) washing the sturgeon skin of step 2) with water to neutral, placing the sturgeon skin in a two-phase aqueous extraction solution that includes 12% (w/v) PEG4000, 15% (w/v) $Na_2SO_4$, and 1% (w/v) KCl, mixing the sturgeon skin and the two-phase aqueous solution well to let the protein from the sturgeon skin to be dissolved in the solution, letting the two-phase aqueous solution be separated into two layers, and collecting the top phase layer of the extraction solution;

4) heating the top phase layer of step 3) with a water bath at 50-70° C. for 5-9 hours, filtering the top phase layer under vacuum to obtain a first filtrate and a filter cake, placing the filter cake in water to obtain a filter cake solution, heating the filer cake solution with the water bath at 60-80° C. for 3-6 hours, filtering filter cake solution under vacuum to obtain a second filtrate, combining the first filtrate and second filtrate and centrifuging combined filtrate, collecting a supernatant after centrifugation, and concentrating and lyophilizing the supernatant to obtain 15 grams of the sturgeon skin gelatin, a yield of 30%.

EXAMPLE 2: Sturgeon Skin Gelatin Identification 1) adding 0.3 gram of the sturgeon skin gelatin from Example 1 to 30 mL water, heating the water to complete dissolve the sturgeon skin gelatin, taking 5 mL sturgeon skin gelatin solution, adding a mixture of potassium dichromate and dilute hydrochloric acid solution (4:1) to the sturgeon skin gelatin solution, and an orange precipitate appearing in the solution.

2) taking 1 mL of the sturgeon skin gelatin solution from step 1), diluting with 100 mL water, adding a few drops of tannic acid solution, and the solution becoming turbid.

3) taking 5 mL of the sturgeon skin gelatin solution from step 1), adding soda lime and heating the solution, and the reaction giving off ammonia odor.

The above three tests confirm that the presence of gelatin.

EXAMPLE 3: Sturgeon Skin Gelatin Solution pH Value 0.5 gram of the sturgeon skin gelatin from Example 1 was added to 50 mL of hot water and dissolved. The solution was cooled to 35° C., and measured for pH value. The pH value of the solution was 7.10, and the solution was neutral.

EXAMPLE 4: Sturgeon Skin Gelatin Solution Transmittance 10.0 gram of the sturgeon skin gelatin from Example 1 was added to deionized water to prepare a 6.67% (w/v) gelatin solution. This 6.67% gelatin solution has a light transmittance of 73% at 660 nm when measured with a UV spectrophotometer.

EXAMPLE 5: Sturgeon Skin Gelatin Ash Value Measurement 1.0 gram of sturgeon skin gelatin was slowly burned in a crucible to completely carbonized, and gradually heated to 600-700° C. The remaining ash is about 0.67% of the sturgeon skin gelatin, less than the edible gelatin standard of 2.0%. Compared with other gelatin, the ash value of sturgeon skin gelatin is low, indicating good gelatin property.

EXAMPLE 6: Sturgeon Skin Gelatin Drying Weight Loss Measurement 1.0 gram of sturgeon skin gelatin was dried at 105° C. to a constant weight, and placed in a stainless steel or aluminum container (diameter 75 mm). 10 mL water was added to the sturgeon skin gelatin, and the sturgeon skin gelatin expanded. The expanded sturgeon skin gelatin was heated in a water bath at 105° C. to a constant weight. The drying weight loss of the sturgeon skin gelatin is 7.0%, less than the edible gelatin standard of 16.0%.

Figure 2:
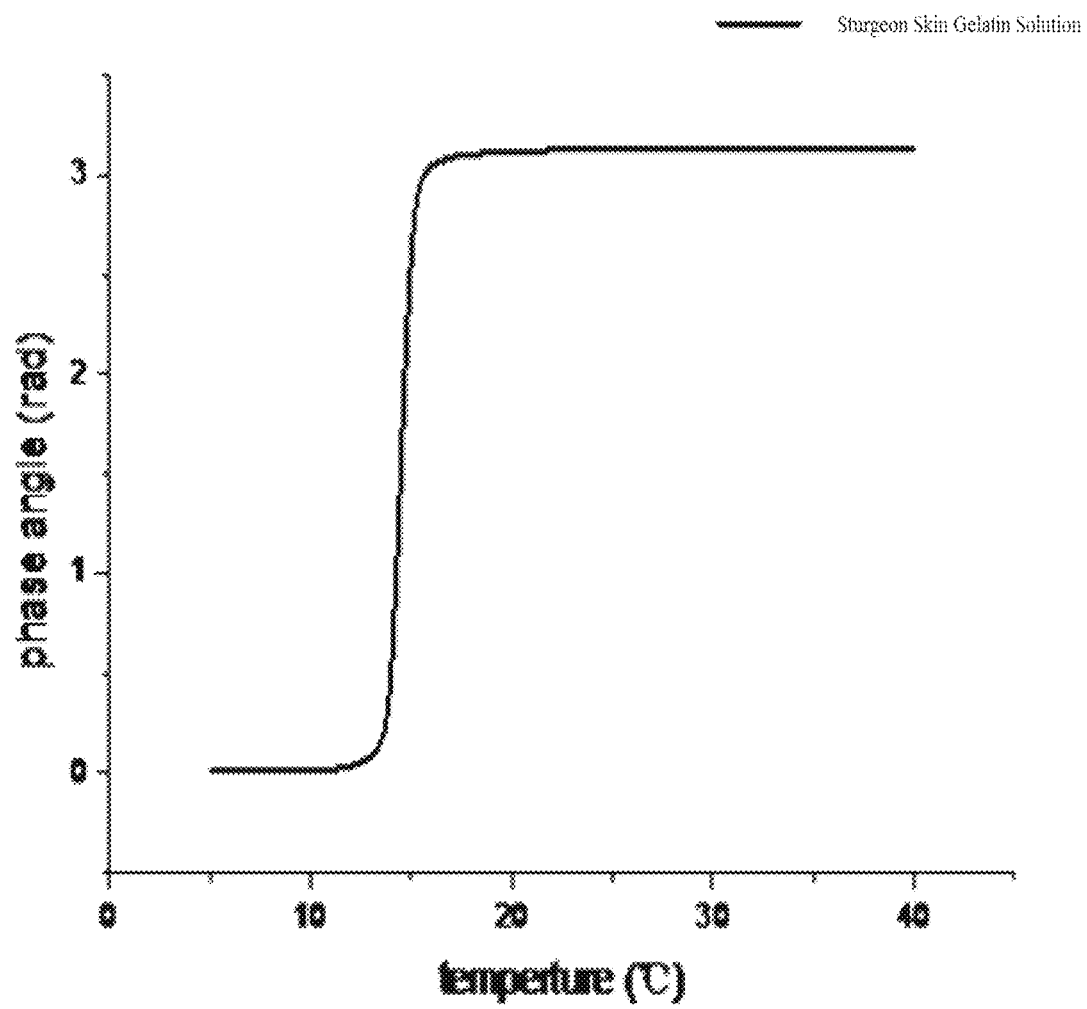
FIG. 2 shows the phase angel of a 6.67% sturgeon skin gelatin solution in a heating process.

EXAMPLE 7: Sturgeon Skin Gelatin Kinetic Viscosity Measurement 10.0 gram of the sturgeon skin gelatin was added to deionized water to prepare a 6.67% (w/v) gelatin solution. The solution was heated at 60° C. for 30 minutes. The cooling process is 40-5° C., and the heating process is 5-40° C. The scan rate is 0.5° C./min, frequency is 1 Hz, and oscillatory stress is 3.0 Pa. The results are shown in FIG. 1, FIG. 2.

Kinematic viscosity was measured at a rate of 0.5° C./min in the cooling process (40-5° C.) and in the heating process (5-40° C.). Storage modulus (G') indicates that the elastic energy stored in the gelatin structure. Loss modulus (G") indicates that the energy loss. Phase angle (δ) measures the change in the stress and tension of gelatin with different transformation processes. FIGS. 1 and 2 indicate the phase angle of sturgeon skin gelatin. FIG. 1 shows that the gelatin forms at 7° C. in the cooling process. FIG. 2 shows that gelatin dissolves at 14° C., as G' plummets.

EXAMPLE 8: Sturgeon Skin Gelatin Strength Measurement

Gelatin strength relates to proline and hydroxyproline content. A low proline and hydroxyproline content leads to weak gelatin strength.

10.0 gram of the sturgeon skin gelatin was added to deionized water to prepare a 6.67% (w/v) gelatin solution. The solution was heated at 60° C. for 30 minutes, and transferred to a beaker (a diameter of 3 cm, a height of 4.5 cm). The gelatin strength was measured with a TA.XT2i food texture analyzer.

The strength of the sturgeon skin gelatin is 434 grams, greater than a regular gelatin, indicating good gelatin strength.

EXAMPLE 9: Preparing Sturgeon Skin Gelatin Film 50 grams of sturgeon skin gelatin was dissolved in 1000 mL water to prepare a 5% sturgeon skin gelatin solution. The solution was heated with a 30° C. water bath and stirred to fully dissolve the sturgeon skin gelatin, and filtered.

A plasticizing agent (glycerine) was added to the sturgeon skin gelatin solution in a ratio of 10:1 (sturgeon skin gelatin:glycerine), stirred and filtered with double filter paper under vacuum.

The filtered solution was sonicated to remove air bubbles, placed on an acrylic glass, dried at room temperature for 2 days to obtain a sturgeon skin gelatin film. The sturgeon skin gelatin film was stored in desiccator.

EXAMPLE 10: Preparing Sturgeon Skin Gelatin Film 50 grams of sturgeon skin gelatin was dissolved in 1000 mL water to prepare a 5% sturgeon skin gelatin solution. The solution was heated with a 30° C. water bath and stirred to fully dissolve the sturgeon skin gelatin, and filtered.

A plasticizing agent (glycerine) was added to the sturgeon skin gelatin solution in a ratio of 15:1 (sturgeon skin gelatin:glycerine), stirred and filtered with double filter paper under vacuum.

The filtered solution was sonicated to remove air bubbles, placed on an acrylic glass, dried at room temperature for 2 days to obtain a sturgeon skin gelatin film. The sturgeon skin gelatin film was stored in desiccator. Compared with the film of Example 9, the film of Example 10 is more brittle, easily broken. The experimental condition of Example 9 is therefore preferred.

EXAMPLE 11: Sturgeon Skin Gelatin Film Thickness Measurement

The film thickness was measured using a handheld micrometer (543-690, Mitutoyo Corp., Kawasaki-shi, Japan). Five locations (4 corners and one center) on each film sample were used for determining thickness. The thickness measurement is shown in Table 1.

TABLE 1

| | Film Thickness | | | | | |
|---|---|---|---|---|---|---|
| Thickness | Measurement ($10^{-2}$ mm) | | | | | Average ($10^{-2}$ mm) |
| d1 | 5.1 | 5.5 | 5.2 | 5.4 | 4.9 | 5.22 |
| d2 | 4.9 | 4.9 | 5.2 | 5.8 | 4.8 | 4.92 |
| d3 | 5.0 | 5.8 | 5.4 | 4.8 | 4.6 | 5.12 |

Overall: d = (d1 + d2 + d3)/3 = 5.08 ($10^{-2}$ mm)

The sturgeon skin gelatin was evenly spread on a flat plate, so the sturgeon skin gelatin film has uniform thickness. In fact the largest difference in measured thickness shown in Table 1 is 0.003 mm.

EXAMPLE 12: Sturgeon Skin Gelatin Film Mechanical Properties Measurement

Tensile strength (TS) and elongation at break (E %) of films were determined by using a universal materials testing machine (Lloyd Instruments plc, Fareham, Hampshire, UK). Films were conditioned at room temperature and 50±5% RH for 72 hours before the test. Eight film samples (2×5 $cm^2$) with an initial grip length of 3 cm were prepared from each film to test their mechanical properties. The average thickness of each film sample was used to estimate the cross-sectional area. The initial grip separation and mechanical crosshead speed of films was set at 30 mm/min. The maximum load and the final extension at break were used for calculating TS and EAB.

Figure 3:
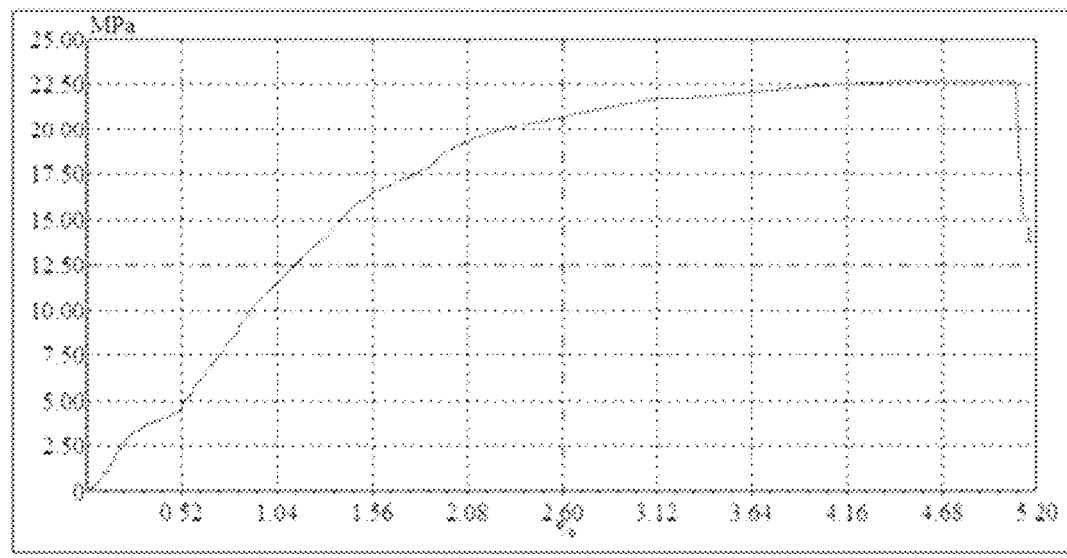
FIG. 3 shows the mechanical properties test results of a sturgeon skin gelatin film.

The results are shown in FIG. 3. As shown in FIG. 3, TS=22.710 MPa, and E %+4.90%.

The TS and E % of the sturgeon skin gelatin film are slightly lower than those of pig skin gelatin film (48 MPa, 5.3%). The sturgeon skin gelatin film is comparable to mammalian gelatin film, and has good mechanical properties.

EXAMPLE 13: Sturgeon Skin Gelatin Film Solubility Measurement

The water solubility of the sturgeon skin gelatin film was determined. 0.250 gram of the sturgeon skin gelatin film was first dried at 105° C. in an oven to a constant weight, and then weighed ($W_0$). The film was immersed into 550 mL of distilled water for 24 hours. The mixture was centrifuged at 9000 r/min for 10 minutes. The supernatant was discarded, and the remaining gelation film at 105° C. in an oven to a constant weight, and weighted (W). The water solubility can be calculated as follows:

$$WS(\%)=[(W_0-W)/W]\times 100\%$$

Test Results: WS (%)=77.7%

0.250 gram of sturgeon skin gelatin film was dried at 105° C. to constant weight and placed to 500 mL deionized water for 24 hours. The solution was centrifuged. The results show that WS (%) is 77.7%. The solubility of the sturgeon skin gelatin film is average, and it is suitable for low water content food packaging.

EXAMPLE 14: Sturgeon Skin Gelatin Film Water Vapor Permeability Measurement

Water vapor permeability (WVP) was measured. The sturgeon skin gelatin film was dried in a desiccator for 2 hours. The dried sturgeon skin gelatin film was cut into circular shape, and placed in a water vapor permeability instrument for measurement.

Figure 4:
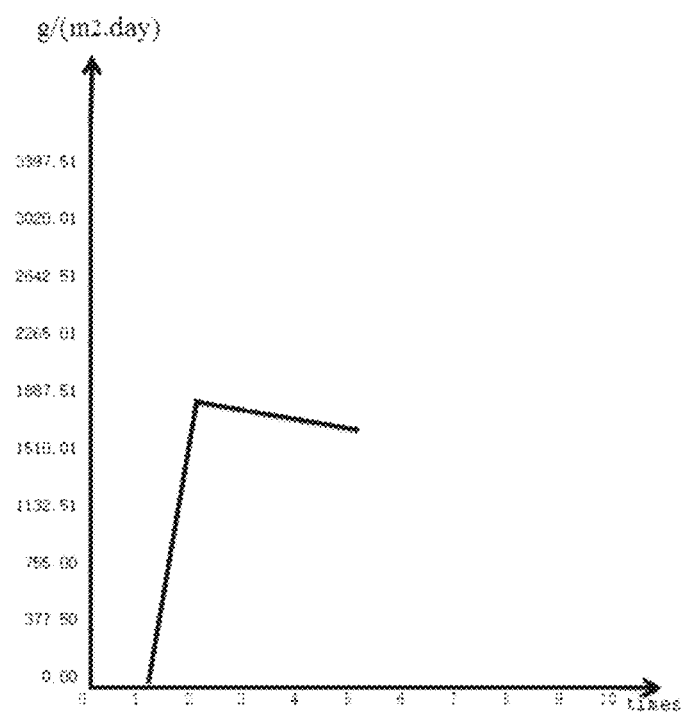
FIG. 4 shows the water vapor permeability test results of a sturgeon skin gelatin film.

Water vapor permeability measures the amount of the water vapor passing through a unit of film with a unit of thickness, under a unit of pressure, in a unit of time. The higher water vapor permeability, the less amount of water vapor passing through the film. The test result is shown in FIG. 4.

The test result: water vapor permeability (WVP) =1750.5096 g/($m^2$·day)

The water vapor permeability of sturgeon skin gelatin film is low, and has good water prevention property.

EXAMPLE 15: Sturgeon Skin Gelatin Film Light Transmittance Measurement

The sturgeon skin gelatin film was cut into 4 cm×1 cm pieces, and placed in a UV spectrophotometer for measurement at 600 nm. Transmittance (T) was calculated as follows.

$$T=A_{600}/d$$

$A_{600}$ is the absorbance at 600 nm, and d is the thickness of the sturgeon skin gelatin film (mm).

A high transparency value represents the lower transparency of film.

The transmittance affects the quality of the gelatin films. Gelatin films with high transmittance are desirable and suitable for food packaging.

Test results: $A_{600}=0.073$, $d=0.098$ mm; $T=0.745$ mm$^{-1}$

The sturgeon skin gelatin film is transparent, and has good light transmission property.

EXAMPLE 16: Sturgeon Skin Gelatin Film Antioxidant Activity Measurement—DPPH Method The sturgeon skin gelatin film was solved in 5% SDS (sodium dodecyl sulfate), and heated with a water bath at 85° C. for 1 hour. The solution was centrifuged at room temperature. 2 mL of the supernatant from the centrifuge was added to 2 mL of 0.15 mM 2,2-diphenyl-1-picryl hydrazyl (DPPH). The mixture was mixed and incubated in the dark at room temperature for 20 minutes. Then, the mixture was centrifuged at 4000 r/min for 10 minutes. The absorbance was read at 517 nm using a spectrophotometer. The assay was conducted in triplicate. The DPPH radical scavenging activity was calculated as follows:

Scavenging activity (%)=$100\times[1-(A_i-A_j)/A_0]$ $A_i$, $A_j$, and $A_0$ are the absorbances of film after treatment with DPPH, film without treatment with DPPH, and control (DPPH solution), respectively.

DPPH test results are shown in Table 2.

TABLE 2

| | Scavenging Activity | | | |
|---|---|---|---|---|
| Sample | $A_0$ | $A_i$ | $A_j$ | Scavenging Activity |
| Sturgeon skin gelatin film | 0.606 | 0.402 | 0.065 | 45.6% |
| Cowhide gelatin film | 0.486 | 0.465 | 0.078 | 20.4% |

As shown in Table 2, the scavenging activity of sturgeon skin gelatin film is 45.6%, and that of cowhide gelatin film is 20.4%. The sturgeon skin gelatin film has better scavenging activity than the cowhide gelatin film.

EXAMPLE 17: Sturgeon Skin Gelatin Film Antioxidant Activity Measurement—Reduction Method In an acidic solution, a reducing substance reacts with potassium ferricyanide to produce potassium ferrocyanide. $Fe^{2+}$ then may react with potassium ferricyanide (high concentration) to produce soluble Prussian blue. Prussian blue can be measured by the absorbance at 700 mm. Higher absorbance at 700 mm indicates greater reduction ability of the substance. The results are shown in Table 3.

TABLE 3

| | Absorbance at 700 mm | | | |
|---|---|---|---|---|
| Sample | A1 | A2 | A3 | A (average) |
| Sturgeon skin gelatin film | 0.126 | 0.124 | 0.125 | 0.125 |
| Vitamin C | 0.178 | 0.178 | 0.176 | 0.177 |

The reduction ability of the sturgeon skin gelatin film is similar to that of Vitamin C. The sturgeon skin gelatin film has good antioxidant activity.

EXAMPLE 18: Sturgeon Skin Gelatin Film Characterization (1) sturgeon skin gelatin film infrared (IR) spectroscopy The sturgeon skin gelatin film was placed in the sample chamber, and the resolution is set at 2 cm$^{-1}$. Fourier transform infrared spectroscopy at a full band (500-4000 cm$^{-1}$) scans to analyze the infrared spectrum of the film.

Figure 5:
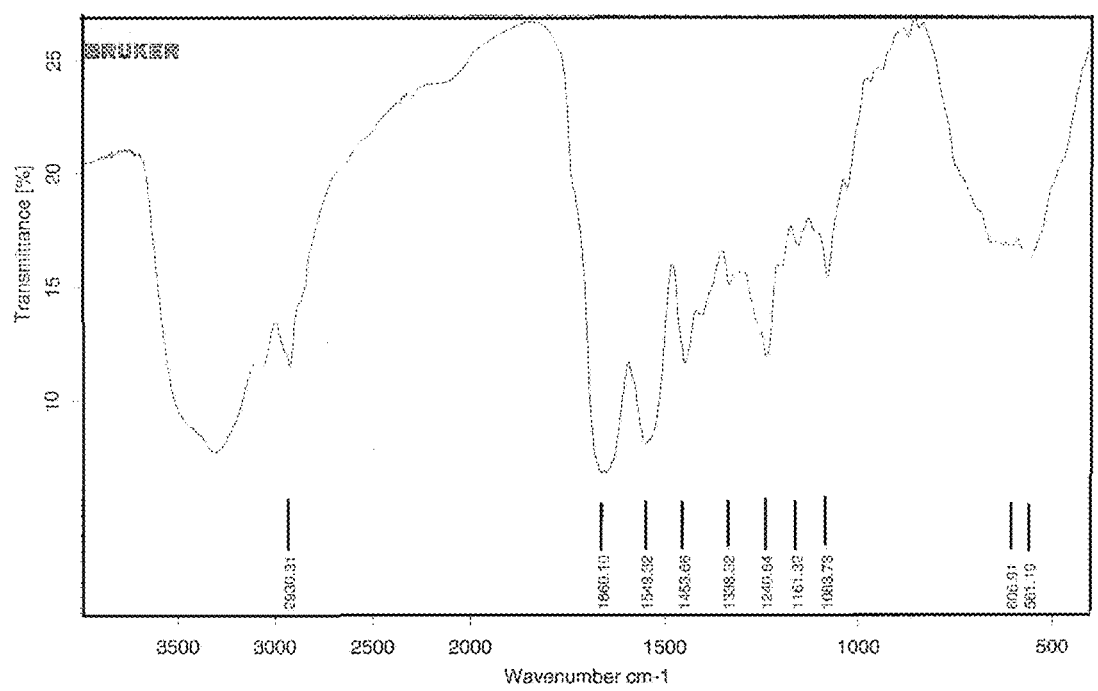
FIG. 5 is the Fourier transform infrared spectroscopy of a sturgeon skin gelatin film.

FIG. 5 shows that the sturgeon skin gelatin film has the following characteristic peaks:

3300 cm$^{-1}$: NH, OH stretching vibration;

29330 cm$^{-1}$: $CH_2$ asymmetric stretching vibration peak;

1660 cm$^{-1}$: amide band I (C=O, imine C=H stretching vibration);

1549 cm$^{-1}$: amide band II (NH bending vibration peak);

1240 cm$^{-1}$: amide band III (NH deformation peak);

1338 cm$^{-1}$: amide band IV, $CH_2$ of proline side chains;

606 cm$^{-1}$: amide V band;

1453 cm$^{-1}$: NH or NH stretching deformation peaks;

1083 cm$^{-1}$: C—O—C and C—O—H stretching vibration.

Figure 6:
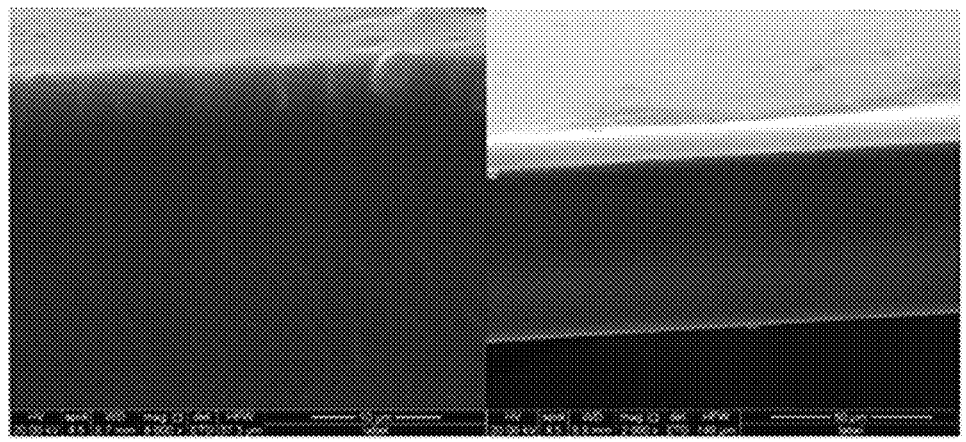
FIG. 6 is the scanning electron microscopy (SEM) of the surface of sturgeon skin gelatin film.
Figure 7:
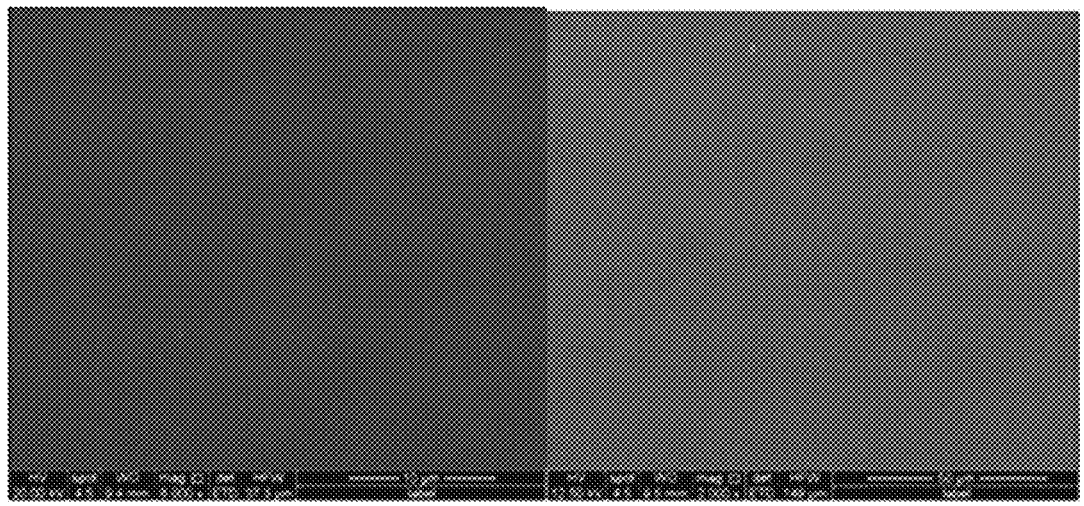
FIG. 7 is the scanning electron microscopy (SEM) of the freeze-fractured cross sections of sturgeon skin gelatin film.

(2) Scanning Electron Microscopy (SEM) Analysis:

The morphology of the surface and cross-section of the film samples were visualized using a scanning electron microscopy (Q45 FEI, Eindhoven, the Netherlands). Film specimens were fractured in liquid nitrogen and mounted on copper stubs perpendicularly to their surface. All samples were examined at an accelerating voltage of 10 kV. FIG. 6 is the SEM micrograph of the surface of the sturgeon skin gelatin film, and FIG. 7 is the SEM micrograph of the freeze-fractured cross section of the sturgeon skin gelatin film. It was observed that the surface of the sturgeon skin gelatin film was smooth and homogeneous without brittle areas, porous structure or bubbles and the sturgeon skin gelatin has a uniform dispersion system.

(3) Thermal Gravimetric Analysis

Figure 8:
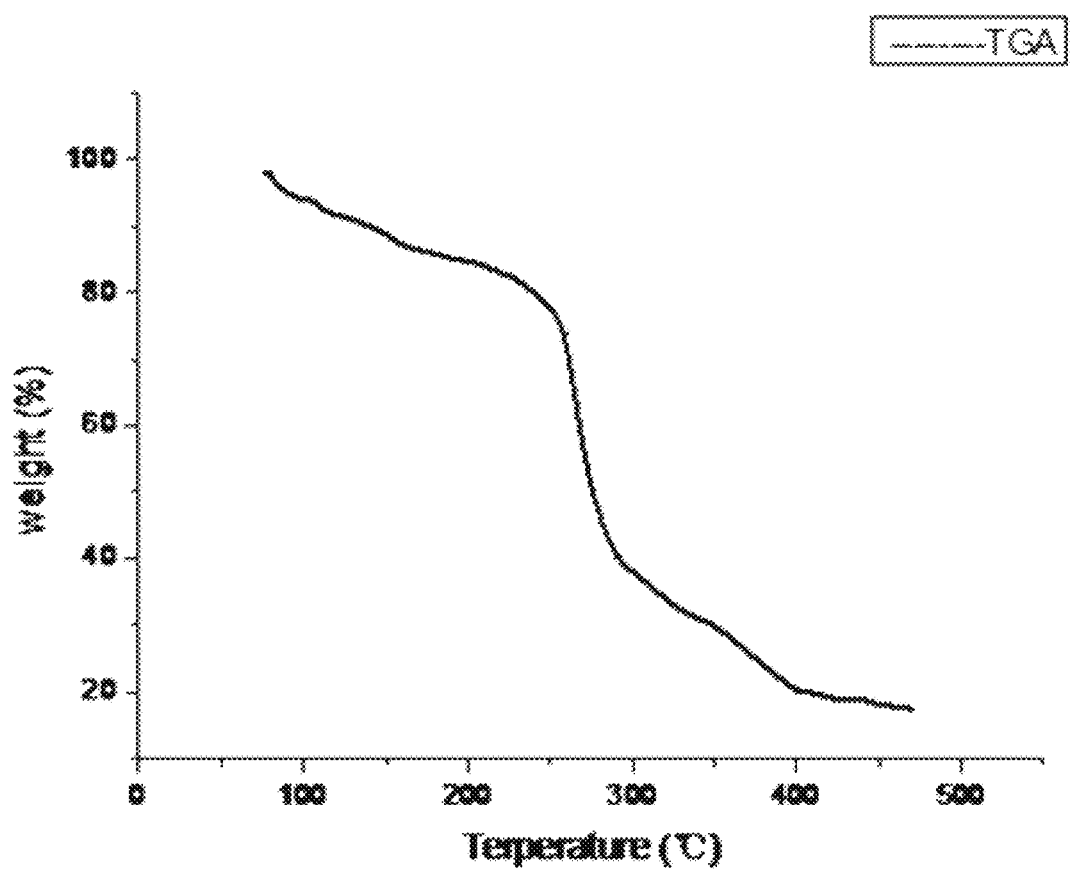
FIG. 8 shows the thermo-gravimetric analysis results of a sturgeon skin gelatin film.

Before analysis, the sturgeon skin gelatin film was conditioned in a desiccator containing $P_2O_5$ for 7 days at room temperature. Dehydrated films were scanned using a thermo-gravimetric analyzer (Q500, TA, New Castle, USA) from 20 to 600° C. at a rate of 10° C./min. Nitrogen was used as the purge gas at a flow rate of 20 ml/min. The analysis results are shown in FIG. 8. As shown in FIG. 8, the sturgeon skin gelatin film slowly lost weight from room temperature to 200° C. It is mainly due to the loss of water from the sturgeon skin gelatin film. The sturgeon skin gelatin film lost major weight from 250° C. to 400° C. It is mainly due to the deposition of the protein. The sturgeon skin gelatin film lost all the weight after 400° C. This indicates that the protein completely decomposed Thermal gravimetric analysis indicates the sturgeon skin gelatin film has a certain thermal stability.

The infrared spectrum shows the absorption peak of the amide bands I, II, and III. SEM micrographs of the sturgeon skin gelatin film indicates that the surface of the sturgeon skin gelatin film was smooth and homogeneous without brittle areas, porous structure or bubbles and the sturgeon skin gelatin has a uniform dispersion system. Thermal gravimetric analysis indicates the sturgeon skin gelatin film has a certain thermal stability.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of producing a sturgeon skin gelatin with antioxidant activity comprising the following steps:
    1) drying the sturgeon skin naturally, placing the sturgeon skin in water; a weight ratio of sturgeon skin and water being 1:10-15, soaking sturgeon skin in distilled water at 4° C. for 24 hours, and sonicating the sturgeon skin for 2 hours to let the sturgeon skin swell up;
    2) cutting the sturgeon skin of step 1) into pieces, soaking the sturgeon skin in a NaOH solution at 2-6° C. for 3-5 hours, washing the sturgeon skin to neutral, and soaking the sturgeon skin in an HCl solution at 2-6° C. for 3-5 hours;
    3) washing the sturgeon skin of step 2) to neutral, placing the sturgeon skin in an extraction solution for extracting sturgeon skin protein, the extraction solution being a two-phase aqueous solution and including PEG4000, $Na_2SO_4$, and KCl, and collecting a top phase layer of the extraction solution, the extraction solution including 10-12% of PEG4000, 14-16% of $Na_2SO_4$, and 1% of KCl; and
    4) heating the top phase layer of step 3) with a water bath at 50-70° C. for 5-9 hours, filtering the top phase layer to obtain a first filtrate and a filter cake, placing the filter cake in water to obtain a filter cake solution, heating the filer cake solution with the water bath at 60-80° C. for 3-6 hours, filtering filter cake solution to obtain a second filtrate, combining the first filtrate and second filtrate and centrifuging combined filtrate, collecting a supernatant after centrifugation, and lyophilizing the supernatant to obtain the sturgeon skin gelatin.

2. The method of claim 1, wherein in step 1), the sturgeon skin is sonicated at 20-40 KHz.

3. The method of claim 1, wherein in step 2), a concentration of the NaOH solution is 2.0%, a weight ratio of the sturgeon skin and the NaOH solution is 1:1-15, and a concentration of the HCl solution is 0.1-0.5%.

4. The method of claim 3, wherein the weight ratio of the sturgeon skin and the NaOH solution is 1:10-15.

5. A method of producing a sturgeon skin gelatin film with antioxidant activity comprising the following steps:
    0) producing a sturgeon skin gelatin with antioxidant activity according to the method of claim 1;
    1) dissolving the sturgeon skin gelatin from step 0) in water to obtain a sturgeon skin gelatin solution by heating with a water bath at 20-40° C. and stirring, a weight ratio of the sturgeon skin gelatin and water being 1:10-30, and filtering the sturgeon skin gelatin solution;
    2) adding glycerine to the sturgeon skin gelatin solution of step 1) and stirring, a weight ratio of the sturgeon skin gelatin and glycerine being 5-15:1, and filtering the sturgeon skin gelatin solution;
    3) sonicating the sturgeon skin gelatin solution of step 2) to remove air bubbles, placing the sturgeon skin gelatin solution on an acrylic glass, and drying the sturgeon skin gelatin solution at room temperature for 2-3 days to obtain the sturgeon skin gelatin film.

6. The method of claim 5, wherein in step 1), the weight ratio of the sturgeon skin gelatin and water being 1:20.

7. The method of claim 5, wherein in step 1), heating with a water bath is at 30° C.

8. The method of claim 5, wherein in step 2), the weight ratio of the sturgeon skin gelatin and glycerine being 10:1.

\* \* \* \* \*